United States Patent
Strebl et al.

(10) Patent No.: US 10,125,293 B2
(45) Date of Patent: Nov. 13, 2018

(54) ADHESIVE TAPE FOR PROTECTING SURFACES

(71) Applicant: tesa SE, Norderstedt (DE)

(72) Inventors: Maike Strebl, Hamburg (DE); Patrick Kerep, Hamburg (DE); Tobias Blömker, Hamburg (DE); Kerstin Klingeberg, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/317,703

(22) PCT Filed: Jun. 11, 2015

(86) PCT No.: PCT/EP2015/063042
§ 371 (c)(1),
(2) Date: Dec. 9, 2016

(87) PCT Pub. No.: WO2015/189326
PCT Pub. Date: Dec. 17, 2015

(65) Prior Publication Data
US 2017/0121568 A1  May 4, 2017

(30) Foreign Application Priority Data

Jun. 11, 2014 (DE) .......... 10 2014 211 187

(51) Int. Cl.
| | | |
|---|---|---|
| C09J 7/02 | (2006.01) |
| C09J 7/22 | (2018.01) |
| C08G 18/66 | (2006.01) |
| C08G 18/75 | (2006.01) |
| C08G 18/12 | (2006.01) |
| C08G 18/32 | (2006.01) |
| C08G 18/42 | (2006.01) |
| C09J 175/06 | (2006.01) |
| C09J 7/38 | (2018.01) |
| C09J 7/25 | (2018.01) |

(52) U.S. Cl.
CPC .............. C09J 7/22 (2018.01); C08G 18/12 (2013.01); C08G 18/3203 (2013.01); C08G 18/425 (2013.01); C08G 18/4238 (2013.01); C08G 18/664 (2013.01); C08G 18/755 (2013.01); C09J 7/255 (2018.01); C09J 7/38 (2018.01); C09J 175/06 (2013.01); C08G 2170/40 (2013.01); C09J 2201/122 (2013.01); C09J 2467/006 (2013.01); C09J 2475/00 (2013.01)

(58) Field of Classification Search
None
See application file for complete search history.

(56) References Cited

U.S. PATENT DOCUMENTS

| | | | | |
|---|---|---|---|---|
| 3,718,518 A | * | 2/1973 | Bock .................. | B29D 35/064 |
| | | | | 156/244.25 |
| 4,946,535 A | | 8/1990 | Meckel et al. | |
| 5,853,876 A | * | 12/1998 | Takano ................ | B32B 7/06 |
| | | | | 428/343 |
| 2002/0094444 A1 | * | 7/2002 | Nakata ................ | B32B 27/36 |
| | | | | 428/480 |
| 2005/0019587 A1 | * | 1/2005 | Luhmann .......... | C08G 18/4812 |
| | | | | 428/423.1 |
| 2011/0003146 A1 | * | 1/2011 | Qiu .................. | C08G 18/1808 |
| | | | | 428/355 N |
| 2011/0111221 A1 | * | 5/2011 | Schumann ........... | C08G 18/12 |
| | | | | 428/355 N |
| 2017/0002238 A1 | * | 1/2017 | Ihrig .................. | C08G 18/12 |
| 2017/0121579 A1 | * | 5/2017 | Blomker ............... | C09J 175/06 |
| 2017/0362478 A1 | * | 12/2017 | Blomker ............... | C08G 18/10 |

FOREIGN PATENT DOCUMENTS

| | | |
|---|---|---|
| DE | 28 45 541 A1 | 6/1980 |
| DE | 100 22 437 A1 | 11/2001 |
| DE | 10 2009 046 657 A1 | 5/2011 |
| DE | 10 2010 063 597 A1 | 6/2012 |
| EP | 0 192 946 A1 | 9/1986 |
| JP | S 63 189486 A | 8/1988 |
| JP | H 08 157798 A | 6/1996 |
| JP | 2002 53828 A | 2/2002 |
| JP | 2007 70422 A | 3/2007 |

OTHER PUBLICATIONS

Definition "obtainable" from Merriam Webster online dictionary, retrived on Nov. 7, 2017.*

(Continued)

*Primary Examiner* — Anish P Desai
(74) *Attorney, Agent, or Firm* — Norris McLaughlin P.A.

(57) ABSTRACT

The invention relates to an extensively biologically degradable adhesive tape, which in particular has a good and quickly established anchoring between the adhesive and the carrier. The invention relates to an adhesive tape for protecting surfaces, comprising an adhesive H, containing at least 60 wt %, at least one polyurethane P, obtainable from chemical cross-linking of a polyurethane pre-polymer, obtainable from the chemical reaction of d) one or a plurality of aliphatic polyester polyols A having a hydroxy functionality of 1.8 through 2 and a number-averaged molecular weight of equal to/greater than 1,000 g/mole; e) one or a plurality of compounds B having a hydroxy functionality of 1.8 through 2 and a number-averaged molecular weight of less than 1,000 g/mol; f) one or a plurality of aliphatic diisocyanates C; wherein the ratio of the total number of isocyanate groups to the total number of hydroxy groups of the substances involved in the chemical reaction for building the prepolymer is greater than/equal to 0.4 and less than 1; and a biodegradable carrier.

8 Claims, No Drawings

(56) References Cited

OTHER PUBLICATIONS

SATAS; Handbook of Pressure Sensitive Adhesive Technology; 3rd Edition, 1999, pp. 153-203.
International Search Report dated Sep. 17, 2015.

* cited by examiner

ADHESIVE TAPE FOR PROTECTING SURFACES

This application is a 371 of PCT/EP2015/063042, filed Jun. 11, 2015, which claims foreign priority benefit under 35 U.S.C. § 119 of the German Patent Application No. 102014211187.0, filed Jun. 11, 2014, the disclosures of which are incorporated herein by reference.

The invention is situated within the field of pressure-sensitive adhesive tapes, as are used for example as surface protection tapes. The invention relates specifically to adhesive tapes for protecting surfaces, said tapes comprising a polyester-based carrier material and a pressure-sensitive adhesive based on a polyester-polyurethane.

Pressure-sensitive adhesiveness is that property of a substance whereby it enters into a permanent bond to a substrate even under relatively weak applied pressure. Substances possessing this quality are identified as pressure-sensitive adhesives (PSAs). PSAs are long-established products. Frequently they can be detached from the substrate again after use, with substantially no residue. PSAs generally at room temperature have a permanent inherent stickiness, thus having a certain viscosity and tack, and so they wet the surface of the respective substrate even under low applied pressure. The capacity of a PSA to adhere to materials and to transmit forces derives from the adhesion capacity and the cohesion of the PSA.

PSAs can be viewed as liquids with extremely high viscosity with an elastic component. Accordingly, PSAs have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure, and the degree of crosslinking of the respective PSA but also on the rate and duration of the deformation, and on the temperature.

The proportional viscous flow is necessary for the achievement of adhesion. Only the viscous components, brought about by macromolecules with relatively high mobility, permit effective wetting and flow onto the substrate where bonding is to take place. A high viscous flow component results in high tack (also referred to as surface stickiness) and hence often also in high peel adhesion. Highly crosslinked systems, crystalline polymers, or polymers with glasslike solidification lack flowable components and are therefore in general devoid of tack or at least possess only little tack.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. As a result of these forces of resilience, an adhesive bond is able to withstand a long-term load acting on it, in the form of a long-term shearing load, for example, sufficiently over a relatively long time period.

For the more precise description and quantification of the extent of elastic and viscous components, and also of the proportion of the components to one another, the variables of storage modulus (G') and loss modulus (G") can be employed, as may be determined by means of Dynamic Mechanical Analysis (DMA). G' is a measure of the elastic component, G" a measure of the viscous component, of a substance. Both variables are dependent on the deformation frequency and on the temperature.

The variables can be determined with the aid of a rheometer. In that case, for example, the material under investigation, in the form of a plane-parallel layer, is exposed in a plate/plate arrangement to a sinusoidally oscillating shearing stress. In the case of instruments operating with shear stress control, the deformation is measured as a function of time, and the time offset of this deformation relative to the introduction of shear stress is recorded. This time offset is referred to as phase angle $\delta$.

The storage modulus G' is defined as follows: $G'=(\tau/\gamma)*\cos(\delta)$ ($\tau$=shear stress, $\gamma$=deformation, $\delta$=phase angle=phase shift between shear stress vector and deformation vector). The definition of the loss modulus G" is as follows: $G"=(\tau/\gamma)*\sin(\delta)$ ($\tau$=shear stress, $\gamma$=deformation, $\delta$=phase angle=phase shift between shear stress vector and deformation vector).

A substance and the layer produced from it are deemed in general to be pressure-sensitively adhesive, and are defined as pressure-sensitively adhesive for the purposes of this specification, if at room temperature, here by definition at 23° C., in the deformation frequency range from $10°$ to $10^1$ rad/sec, G' and G" are each situated at least partly in the range from $10^3$ to $10^7$ Pa.

Within this range, which in a matrix plot of G' and G" (G' plotted as a function of G") may also be referred to as a viscoelastic window for PSA applications or as a PSA window according to viscoelastic criteria, there are in turn different sectors and quadrants which characterize more closely the PSA properties to be expected from the associated substances. Within this window, substances with high G" and low G' are generally notable, for example, for a high peel adhesion and a low shear strength, whereas substances with high G" and high G' are notable both for high peel adhesion and for high shear strength.

The findings on the correlations between rheology and pressure-sensitive adhesiveness, generally, are state of the art and are described for example in Satas, "Handbook of Pressure Sensitive Adhesive Technology", Third Edition (1999), pages 153 to 203.

A bonding material or pressure-sensitive adhesive is chemically crosslinked when the bonding material or PSA has achieved, through chemical reaction with a crosslinker, a condition which renders it no longer meltable and no longer soluble in organic solvents. Liquification is then possible only through decomposition, which is irreversible. Crosslinkers contemplated include all substances which have a functionality of at least two and which are able to enter into chemical crosslinking reactions with the functional groups of the bonding material or PSA. Crosslinkers are selected according to the functional groups of the bonding material or PSA. Bonding materials or PSAs which carry carboxyl groups are crosslinked typically with di- or polyepoxides, possibly with additional catalysis, through tertiary amines, for example, or else with metal acetylacetonates, metal alkoxides, and alkoxy-metal acetylacetonates. For the crosslinking of bonding materials or PSAs which carry hydroxyl groups, for example, di- or polyisocyanates are appropriate.

Polymers or prepolymers which possess the property of being meltable and therefore thermoplastically processable are referred to in this specification—as is customary in the terminology of the skilled person—as hotmelts.

A polyurethane prepolymer for the purposes of this specification is an at least oligomeric, but preferably already itself polymeric reaction product, more particularly a meltable reaction product, which is obtained by chemical reaction of one or more polyols with one or more polyisocyanates and which can be converted, with a significant increase in the molar mass, into a target polymer. Polyurethanes contain units linked to one another through urethane moieties —NH—CO—O—.

A polyurethane hotmelt prepolymer in the sense of this specification at room temperature has solidity and dimensional stability such that in known mixing assemblies at room temperature, its continuous, homogeneous mixing with other substances, and also, in particular, its shaping or similar steps of processing, are not possible without the polyurethane hotmelt prepolymer heating up or without the addition of solvents, diluents or other viscosity-lowering additives being necessary. Examples of known mixing assemblies are compounders, internal mixers, extruders, planetary roller extruders, planetary mixers, butterfly mixers, or dissolvers. For the purposes of this specification, a polyurethane hotmelt prepolymer can be processed only when the polyurethane hotmelt prepolymer is dissolved in a solvent or if it is heated, in which case the heat may be supplied from the outside, by heating, or may be generated by shearing. Typical processing temperatures for polyurethane hotmelt prepolymers for the purposes of this specification are in the range from 70° to 160° C., and are at least 40° C. Room temperature is understood in this specification to be 23° C. Melting in this sense does not necessarily mean that at the moment of the transition from the solid, dimensionally stable state to the liquefied, miscible state, it is necessary for a crystalline melting temperature or a glasslike solidification temperature to be exceeded. What is meant at this point is a sufficient lowering of the viscosity.

A polyurethane hotmelt prepolymer for the purposes of this specification has a complex viscosity—as measured with a rheometer in an oscillation test with a sinusoidally oscillating shearing stress in a plate/plate arrangement at a temperature of 23° C. and with an oscillation frequency of 10 rad/s—of at least 1000 Pa*s, preferably at least 3000 Pa*s.

The complex viscosity $\eta^*$ is defined as follows:
$\eta^* = G^*/\omega$ ($G^*$=complex shear modulus, $\omega$=angular frequency).

The further definitions are as follows: $G^* = \sqrt{(G')^2 + (G'')^2}$ ($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\tau$=shear stress, $\gamma$=deformation, $\delta$=phase angle=phase shift between shear stress vector and deformation vector).

$\omega = 2\pi \cdot f$ ($f$=frequency).

Adhesive tapes which are furnished with pressure-sensitive adhesives, known as pressure-sensitive adhesive (PSA) tapes, are nowadays diversely used in the industrial and private spheres. PSA tapes consist customarily of a carrier film, furnished on one or both sides with a PSA. There are also PSA tapes consisting exclusively of a layer of PSA and no carrier film, such tapes being called transfer tapes. The composition of the PSA tapes may vary greatly and is guided by the particular requirements of the various applications. The carriers consist customarily of polymeric films such as, for example, polypropylene, polyethylene, polyester, or else of paper or woven or nonwoven fabric. The PSAs consist customarily of acrylate copolymers, silicones, natural rubber, synthetic rubber, styrene block copolymers, or polyurethanes.

On the basis of environmental considerations and sustainability, and against the background of increasingly scarce petroleum resources, and, on the other hand, a sharp worldwide growth in consumption of plastics, there have been efforts for a number of years to produce plastics on the basis of renewable raw materials. This is especially true of biodegradable polymers which are intended for use in packaging applications or film applications. For medical applications as well, biodegradable products are playing an increasingly important role. Certain biobased or biodegradable plastics are available commercially today. Biobased means "produced from renewable raw materials".

The term "biodegradable polymers" is used for natural and synthetic polymers which have plastics-like qualities (notched impact strength, thermoplastifiability) but which, in contrast to conventional plastics, are degraded by a multiplicity of microorganisms in a biologically active environment (compost, digested sludge, soil, wastewater); this does not necessarily take place under customary household conditions (garden composting). One definition of biodegradability is given in European Standard DIN EN 13432 (biodegradation of packaging) and DIN EN 14995 (compostability of plastics).

The skilled person makes a distinction between disintegration and biodegradability. Disintegration refers to physical breakdown into very small fragments. Determining the disintegrability (the degree of disintegration) of polymers is described in texts including DIN EN ISO 20200. In that case, the sample under analysis is stored in a defined artificial solids waste system at 58±2° C. for at least 45 and not more than 90 days. Thereafter the entire sample is passed through a 2 mm sieve and the degree of disintegration D is determined as follows:

$$D = \frac{m_i - m_1}{m_i} \times 100$$

Here
$m_i$ is the initial dry mass of the sample material
and
$m_r$ is the dry mass of the residual sample material obtained by sieving.

Biodegradability is understood in general as the capacity for disintegration of a chemical compound or of an organic material by microorganisms in the presence of oxygen into carbon dioxide, water, and salts of other elements present (mineralization), with formation of new biomass, or, in the absence of oxygen, into carbon dioxide, methane, mineral salts, and new biomass. Biodegradation is accomplished outside and/or inside the cell by bacteria, fungi, and microorganisms, and also their enzymes.

The biodegradability of packing materials is governed in terms of standards by DIN EN 13432 "Requirements for packaging recoverable through composting and biodegradation". In this context, the material for testing is subjected to an aerobic degradation test in accordance with ISO 14855: 1999 "Determination of the ultimate aerobic biodegradability of plastic materials under controlled composting conditions" and a degree of degradation of at least 90% must be achieved in comparison to a suitable reference substance within not more than six months. The degree of degradation here is determined by the measured evolution of carbon dioxide. After comminution, the sample is stored with vermiculite or highly functional aerated compost as inoculum in a vessel equipped with air supply at 58±2° C., and the evolution of $CO_2$ is recorded on an ongoing basis. In view of the complexity of apparatus, there are a number of testing institutes which have specialized in the testing and which subsequently issue a corresponding certificate, such as, for instance, OK compost from Vincotte.

After the end of the testing, the degradation rate $D_t$ is obtained as:

$$D_t = \frac{(CO_2)_T - (CO_2)_B}{ThCO_2} \times 100$$

Here
$(CO_2)_T$ is the cumulative amount of carbon dioxide formed in each composting vessel containing the test substance, in grams per vessel;
$(CO_2)_B$ is the average cumulative amount of carbon dioxide formed in the control vessels, in grams per vessel;
$ThCO_2$ is the theoretical amount of carbon dioxide which the test substance can form, in grams per vessel.

In addition to the biodegradability, DIN EN 13432 also includes a test for determining the quality of the compost produced as a result of degradation. This compost must not have any adverse effects on plant growth.

Generally speaking, biodegradable components also have a high disintegration rate, whereas the disintegration of a material does not automatically imply its biodegradability.

In view of the fact that environmental considerations relating to biodegradability are playing an ever more important part not least for pressure-sensitive adhesive tapes, the past has also seen the presentation of PSA tapes which use biodegradable films as carrier material. The films used are frequently based on compounds of polylactic acid. Like other biodegradable thermoplastic polymers suitable for application, polylactic acid is relatively hard and brittle. In order to be suitable for film applications, these biodegradable polymers contemplated must be compounded with softer polymers, which in many cases lack or have poorer biodegradability.

In terms of the PSAs, the possibilities are further restricted. PSAs are amorphous materials with a low glass transition point.

The conventional scaffold polymers such as natural rubber, styrene block copolymers or polyacrylates are not biodegradable in accordance with the standards which apply in Europe, such as DIN EN 13432, for example. The same is true of the customary tackifier resins such as rosin derivatives, hydrocarbon resins or terpene-phenolic resins. Silicone PSAs are out of the question entirely, on account of their excellent stability with respect to aging. A criterion of biodegradability is customarily the presence of heteroatoms in the main carbon chain. A chemical bond between a carbon atom and a heteroatom such as oxygen or nitrogen, for example, is less stable and hence more amenable to biological degradation than is a bond between two carbon atoms.

In view of these circumstances, polyester PSAs are appropriate for corresponding applications. A frequent disadvantage of polyester PSAs, though, is that the contact peel adhesion of these adhesive systems is at a relatively low level. The addition of customary compatible tackifiers such as tackifying resins, for example, would provide a remedy here, but on the other hand would cause the biodegradability to deteriorate. Moreover, the anchorage of polyester PSAs to numerous substrates is frequently too weak, and so defects referred to as anchorage ruptures are observed when the adhesive tapes are loaded correspondingly.

JP 2007 070 422 A1 describes a biodegradable PSA based on a polyester-polyurethane which, however, has the disadvantage of being meltable. With meltable PSAs it is in principle not possible to achieve good bonding strength at relatively high temperatures.

JP 63 189 486 A discloses a moisture-curing PSA based on a polyester-polyurethane. Moisture-curing PSAs are problematic for use in adhesive tapes, since effective protection from ingress of moisture prior to application is a necessity.

JP 08 157 798 A proposes reacting a liquid polycaprolactone diol and a dicarboxylic acid with di- or polyisocyanates to give a PSA. The reactive system described is initially liquid. Solidification occurs only after the PSA has come about as a result of the chemical reaction described. A disadvantage of liquid reactive systems in relation to continuous coating, which generally represents the central operating step in conventional adhesive tape manufacture, is that in this state they cannot be wound, or at least not with constant layer thickness, on a carrier material, especially not if the layer thicknesses in question are high.

It is an object of the invention to provide surface protection tapes which can be detached easily and largely without residue from the surfaces to be protected. For this purpose it is necessary for the adhesive first to have sufficient cohesion and second to necessarily achieve effective anchorage of the adhesive on the carrier. The affinity of an adhesive for a carrier, as is necessary to achieve this, can be determined, for example, by a measurement of the immediate peel adhesion of the adhesive on the carrier. The adhesive tapes, moreover, are to be largely biodegradable. Furthermore, the adhesive tapes are to have customary mechanical properties.

In order to solve the problem, the invention envisages an adhesive tape based on a biodegradable carrier material and on a pressure-sensitive adhesive based on a linear polyester-polyurethane prepolymer. A first and general subject of the invention is therefore an adhesive tape for protecting surfaces, which comprises
  a pressure-sensitive adhesive H comprising at least 60 wt % of at least one polyurethane P which is obtainable by chemical crosslinking of a polyurethane prepolymer which in turn is obtainable by chemical reaction of
   a) one or more aliphatic polyester polyols A having a hydroxy functionality of from 1.8 up to and including 2 and a number-average molecular weight of greater than or equal to 1000 g/mol;
   b) one or more compounds B having a hydroxy functionality of from 1.8 up to and including 2 and a number-average molecular weight of less than 1000 g/mol;
   c) one of more aliphatic diisocyanates C;
  where the ratio of the total number of isocyanate groups to the total number of hydroxy groups in the compounds participating in the chemical reaction to build the polyurethane prepolymer is greater than or equal to 0.4 and less than 1; and
  a biodegradable carrier.

It has emerged, surprisingly, that adhesive tapes of the invention are comparatively quick to develop strong anchorage forces of the adhesive to the carrier materials. This makes it possible first to use the adhesive tapes very shortly after production, without great storage resources, and secondly enables the adhesive tapes to be removed with little or no residue from the surfaces that are to be protected.

The number-average molecular weight of the polyester polyols A is preferably greater than 1500 g/mol and more preferably greater than 2000 g/mol.

The hydroxyl functionality is understood as the number of hydroxy groups per molecule of a polyol. In this specification, it is expressed relative to the number-averaged average molecular weight of the respective polyol, and is calculated according to the following formula:

$$f = M_n \, [\text{g/mol}] \times \text{OHN} \, [\text{mmol OH/kg}]/10^6$$

f is the hydroxy functionality. $M_n$ is the number-averaged average molecular weight of the respective polyol in the unit [g/mol] and OHN is the hydroxyl number of the polyol in the unit [mmol OH/kg].

The hydroxyl number is a measure of the amount of hydroxyl groups in a polyol. The hydroxyl number is determined here according to DIN 53240. According to that method, the hydroxyl number (OHN) is expressed in the unit [mg KOH/g]. It corresponds to the amount of KOH in [mg] which is equivalent to the amount of acetic acid bound in the acetylation of 1 g of polyol. For simplification of formula calculations, the hydroxyl number in this specification is converted into the unit [mmol OH/kg].

This is done according to the following formula:

$$\text{OHN [mmol OH/kg]} = \text{OHN [mg KOH/g]} \times 1000/56.1$$

where 56.1 is the molar mass of KOH.

The hydroxy functionality of the polyester polyols A of 1.8 to 2 in accordance with the invention represents a high degree of difunctionality, thereby permitting the construction of linear prepolymers.

Suitable polyester polyols A include all commercial aliphatic polyester polyols having the described molecular weight, provided they have the hydroxy functionality in accordance with the invention. Polyester polyols which can be used in accordance with the invention are obtained generally by polycondensation of diols and dicarboxylic acids or, in the case of polycaprolactone polyols, by ring-opening polymerization of ε-caprolactone and a difunctional starter molecule.

At least one of the polyester polyols A, more preferably the polyester polyol A or the polyether polyols A, is/are the product of a chemical reaction of one or more organic dicarboxylic acids selected from the group consisting of adipic acid, maleic acid, succinic acid, caprolatones, fumaric acid, pimelic acid, suberic acid, and glutaric acid, more preferably selected from the group consisting of adipic acid, succinic acid, caprolactones, fumaric acid, pimelic acid, suberic acid, and glutaric acid with one or more diols selected from the group consisting of ethylene glycol, diethylene glycol, triethylene glycol, 1,2-propylene glycol, 1,3-propanediol, 1,4-butanediol, 1,6-hexanediol, 3-methyl-1,5-pentanediol, 2,2,4-trimethylpentane-1,3-diol, 2-butyl-2-ethyl-1,3-propanediol, 2,2-dimethyl-1,3-propanediol, 2-methyl-1,3-propanediol, and 2-ethyl-1,3-hexanediol.

With particular preference the dicarboxylic acid unit of the polyester polyols is adipic acid and/or ε-caprolactone. Preferred polyester polyols are therefore polyadipate polyols and/or polycaprolactone polyols.

The alcohol unit of the polyester polyols is preferably ethylene glycol, diethylene glycol, 1,4-butanediol and/or 1,6-hexanediol. With particular preference at least one of the polyester polyols is a polyadipate polyol which contains ethylene glycol and/or diethylene glycol as monomer unit.

It has further emerged that polyester polyols which carry methyl groups, in other words polyester polyols containing, for example, 2-methyl-1,3-propanediol, 3-methyl-1,5-pentanediol or neopentyl glycol as alcohol unit, may be advantageous for achieving desired adhesive bonding performances, but are more disadvantageous for rapid biodegradability on the part of the polyurethanes prepared with them. Surprisingly, however, even polyurethanes constructed from prepolymers containing such units can be biodegraded with sufficient rapidity in combination with the other components described herein.

The polyester polyols A are prepared preferably from renewable raw material sources, as for example by fermentation of starch or sugar.

The compounds B are preferably selected from the group consisting of polyester diols having a number-average molecular weight of up to 600 g/mol, more preferably of up to 450 g/mol; 2-methyl-1,3-propanediol, 3-methyl-1,5-pentanediol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 2-ethyl-1,3-hexanediol, and 2-butyl-2-ethyl-1,3-propanediol. More preferably the compounds B are selected from the group consisting of polyester diols having a number-average molecular weight of up to 450 g/mol, 2-methyl-1,3-propanediol (CAS No.: 2163-42-0), 3-methyl-1,5-pentanediol (CAS No.: 4457-71-0), ethylene glycol (CAS No.: 107-21-1), diethylene glycol (CAS No.: 111-46-6), triethylene glycol (CAS No.: 112-27-6), and tetraethylene glycol (CAS No.: 112-60-7). More particularly the compound B is diethylene glycol and/or a polyester diol having a number-average molecular weight of up to 450 g/mol.

Examples of suitable diisocyanates C are as follows: butane-1,4-diisocyanate, tetramethoxybutane-1,4-diisocyanate, hexane-1,6-diisocynate, ethylene diisocyanate, 2,2,4-trimethylhexamethylene diisocyanate, ethylethylene diisocyanate, dicyclohexylmethane diisocyanate, 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophorone diisocyanate), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, hydrogenated diphenylmethane diisocyanates such as 4,4'-diisocyanatodicyclohexylmethane, and also chlorinated, brominated, sulfur-containing or phosphorous-containing aliphatic diisocyanates.

More preferably the diisocyanates C are selected from the group consisting of isophorone diisocyanate, 4,4'-diisocyanatodicyclohexylmethane, and hexane-1,6-diisocyanate.

The chemical reaction through which the polyurethane prepolymer is obtainable proceeds preferably in the presence of at least one bismuth carboxylate-containing or bismuth carboxylate derivative-containing catalyst or catalyst mixture, whose use in the acceleration of polyurethane reactions is known fundamentally. A catalyst of this kind considerably steers the pressure-sensitive adhesive properties of the polyurethane P to be produced from the prepolymer in such a way as to achieve surface-specific selectivity of the pressure-sensitive adhesive properties. Examples of such catalysts are bismuth trisdodecanoate, bismuth trisdecanoate, bismuth trisneodecanoate, bismuth trisoctanoate, bismuth trisisooctanoate, bismuth trishexanoate, bismuth trispentanoate, bismuth trisbutanoate, bismuth trispropanoate, and bismuth trisacetate.

Other known catalysts, however, may also be used, such as tertiary amines or organotin compounds, for example.

The ratio of the total number of isocyanate groups to the total number of hydroxyl groups in the compounds participating in the chemical reaction to build the polyurethane prepolymer is preferably greater than or equal to 0.7 and less than 1; more preferably greater than or equal to 0.7 and less than or equal to 0.95; particularly preferably greater than or equal to 0.75 and less than or equal to 0.9. The expression "compounds participating in the chemical reaction" refers in accordance with the invention to all reactants which for the purposes of the intended chemical reaction are brought into contact with one another, irrespective of whether the molecules of the substances in question in fact are all consumed or are only partly consumed by reaction.

The amount-of-substance ratio of the sum or of the entirety of the compounds B to the sum or to the entirety of the polyester polyols A is preferably 0.30 to 2.33, more preferably 0.45 to 1.5, and more particularly 0.5 to 1.

The polyurethane P on which the pressure-sensitive adhesive H of the adhesive tape of the invention is based has very good biodegradability. On account of the high linear structural fractions, the expectation would have been that the polyurethane would have weakly pronounced pressure-sensitive adhesion properties at least, or none at all. Surprisingly, however, it has emerged that the polyurethane has very good pressure-sensitive adhesive qualities over a broad range.

The chemical crosslinking to give the polyurethane P takes place preferably with at least one polyisocyanate D having three or more isocyanate groups. The ratio of the sum of the isocyanate groups of all polyisocyanates C and D to the sum of the hydroxyl groups of components A and B is preferably 0.95 to 1.05.

The chemical crosslinking to give the polyurethane P may take place solventlessly, in other words in the melt, or in an organic solvent or in aqueous dispersion. In the two latter cases, both the polyurethane prepolymer and the crosslinker, thus preferably the polyisocyanate or polyisocyanates D, are present in dispersion in water or in solution in an organic solvent. In order to improve the dispersibility of the prepolymer in water, preferably dimethylolpropionic acid or a substance of similar construction is—as known in the prior art—at least part of the compound(s) B, and—as likewise known in the prior art—the reaction to construct the prepolymer can easily be conducted in such a way that only the OH groups are reacted, whereas the carboxy function remains uninvolved.

The pressure-sensitive adhesive H of the adhesive tape of the invention comprises the polyurethane(s) P at preferably not less than 70 wt %, more preferably not less than 80 wt %, more particularly not less than 90 wt %, very preferably not less than 95 wt %, as for example not less than 97 wt %. Most preferably the pressure-sensitive adhesive H consists of one or more polyurethane(s) P. An advantage of this pressure-sensitive adhesive is that—at least in large parts—it is biodegradable in an aqueous medium and can be disintegrated in a standardized compost.

As already maintained, the polyurethane P is pressure-sensitively adhesive per se. Through controlled guidance of the reactions for the construction and for the crosslinking of the polyurethane prepolymer, it is possible for the pressure-sensitive adhesive properties of the polyurethane to be set within a broad range. In order to adapt the properties of the pressure-sensitive adhesive H, the polyurethane can be mixed with one or more additives such as tackifiers (tackifying resins), plasticizers and/or aging inhibitors.

Preferably, however, the pressure-sensitive adhesive H of the adhesive tape of the invention is free from tackifiers (tackifying resins) and plasticizers, more preferably free form tackifiers (tackifying resins), plasticizers, and aging inhibitors, and more particularly free of any additives whatsoever. Insignificant in this context are residues, arising from production or otherwise, of any substances which result essentially from incomplete removal, and also levels of substance that are within the range of a universal concentration.

The designation "tackifier resin" is understood by the skilled person to refer to a resin-based substance which increases the tack.

Tackifiers are, for example, hydrocarbon resins (for example, polymers based on unsaturated $C_5$ or $C_9$ monomers), terpene phenolic resins, polyterpene resins based on α-pinene and/or β-pinene and/or δ-limonene, aromatic resins such as cumarone-indene resins, or resins based on styrene or α-methylstyrene, and also rosin and derivatives thereof, for example being disproportionated, dimerized or esterified resins, as for example reaction products with glycol, glycerol or pentaerythritol. Preference is given to using natural resins such as rosins and derivatives thereof.

The addition of tackifiers in minor amounts of up to 1 wt % can be made without loss of the biodegradability of the pressure-sensitive adhesive. In the case of relatively large amounts added to the adhesive, however, it is possible for the composition no longer to have its biodegradability. With preference, therefore, tackifiers are not used.

Examples of suitable miscible plasticizers are aliphatic and aromatic mineral oils, polyethylene glycol and polypropylene glycol, diesters or polyesters of phthalic acid, citric acid, trimellitic acid or adipic acid, liquid rubbers (for example, low molecular mass nitrile rubbers or polyisoprene rubbers), liquid polymers of butene and/or isobutene, acrylic esters, polyvinyl ethers, liquid resins and soft resins based on the raw materials of tackifier resins, wool wax and other waxes, or liquid silicones. Particular preference is given to using plasticizers comprising renewable raw materials, such as the biobased polyoxytrimethylene glycol Cerenol® from DuPont, for example, to vegetable oils and preferably refined vegetable oils such as, for example, rapeseed oil and soybean oil, fatty acids or fatty acid esters, or epoxidized vegetable oils, such as epoxidized soybean oil.

Used more particularly are biodegradable plasticizers, preferably diesters or polyesters of citric acid or of adipic acid.

With further preference the plasticizer, more particularly the biodegradable plasticizer, is used in amounts of up to 10 wt % (based on the pressure-sensitive adhesive), very preferably in amounts of up to 5 wt % (based on the pressure-sensitive adhesive), and especially preferably in amounts of up to 2.5 wt % (based on the pressure-sensitive adhesive).

As for the tackifiers, the addition of any plasticizers in small amounts of up to 1 wt % is possible without loss of the biodegradability of the pressure-sensitive adhesive. Here again it is the case that in the case of more substantial amounts added to the adhesive it is possible that the composition will no longer be biodegradable.

Preferably, therefore, plasticizers are not used, or else biodegradable plasticizers are used.

Further possible additives in the pressure-sensitive adhesive H are fillers, for example fibers, carbon black, zinc oxide, titanium dioxide, chalk, solid or hollow glass beads, microballoons, microbeads of other materials, silica, silicates, nanoparticles, wood flour, starch and starch compounds, and other biobased fillers; compounding agents and/or aging inhibitors, the latter in the form, for example, of primary and secondary antioxidants, examples being sterically hindered phenols such as Irganox 1010 and more preferably tocopherol (vitamin E). Light stabilizers as well may be added.

For the additives, the comments made above with regard to the tackifiers and plasticizers apply: in small amounts of up to 1 wt %, the addition even of nonbiodegradable fillers is possible, without substantial detriment to the biodegradability of the adhesive H. In the case of more substantial amounts added to the polyurethane P, it is possible that the pressure-sensitive adhesive will no longer be sufficiently biodegradable. Preferably, therefore, fillers, especially those that are not biodegradable, are not used. Biodegradable fillers, in contrast, can be used even in relatively large amounts.

The biodegradable carrier preferably comprises at least one polyester PolEs which can be traced back to an extent of at least 95 mol % to a monomer composition MonZ which consists of at least one $C_2$ to $C_{12}$ alkanediol and at least one dicarboxylic acid selected from the group consisting of oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassilic acid, fumaric acid, 2,2-dimethylglutaric acid, suberic acid, diglycolic acid, oxalacetic acid, glutamic acid, aspartic acid, itaconic acid, maleic acid, and terephthalic acid, or which is a polycaprolactone.

With particular preference the monomer composition MonZ consists of butanediol and at least one dicarboxylic acid selected from the group consisting of adipic acid, terephthalic acid and succinic acid.

The biodegradable carrier of the adhesive tape of the invention preferably comprises polyester PolEs to an extent totaling at least 40 wt %, based on the total weight of the biodegradable carrier. The biodegradable carrier may further comprise fillers, for example. The biodegradable carrier preferably contains up to 60 wt % of a filler or of two or more fillers selected from the group consisting of fibers, carbon black, zinc oxide, titanium dioxide; calcium carbonate, especially chalk; solid or hollow glass beads, microballoons, microspheres of other materials, silica, silicates, nanoparticles, wood flour, starch and starch compounds, polylactic acids, and polyhydroxyalkanoates. With particular preference the biodegradable carrier contains up to 60 wt % of at least one filler selected from the group consisting of polylactic acids and polyhydroxyalkanoates.

With particular preference the biodegradable carrier consists to an extent of at least 95 wt %, more particularly at least 98 wt %, very preferably at least 100 wt %, based in each case on the total weight of the biodegradable carrier, of polybutylene succinate, a butanediol-adipic acid-terephthalic acid copolymer, or a blend of a butanediol-adipic acid-terephthalic acid copolymer and polylactic acid. In accordance with the invention the biodegradable carrier is preferably a film.

The biodegradable carrier may comprise additives, examples being the adjuvants which are customary in plastics technology such as stabilizers; nucleating agents; lubricants and release agents such as stearates (especially calcium stearate); plasticizers (plasticizing agents) such as, for example, citric esters (especially acetyl tributyl citrate), glyceric esters such as triacetylglycerol or ethylene glycol derivatives, surfactants such as polysorbates, palmitates or laurates; waxes such as, for example, erucamide, stearamide or behenamide, bees wax or bees wax esters; antistats, UV absorbers; UV stabilizers; antifog agents or dyes. The additives are present preferably at concentrations of 0 to 5 wt %, more particularly of 0.1 to 2 wt %, based on the total weight of the biodegradable carrier.

The carrier may be furnished on one or both sides with PSA. In the case of double-sided furnishing with PSA, the second PSA is likewise preferably a PSA H. More particularly the PSA or PSAs consists or consist of one or more polyurethane(s) P.

The adhesive tape of the invention is preferably formed by application of the PSA, partially or over the whole area, to the carrier. Coating may also take place in the form of one or more stripes in lengthwise direction (machine direction), optionally in transverse direction, but more particularly takes place over the whole area. Furthermore, PSA may be applied in patterned dot format by means of screen printing, in which case the dots of adhesive may also differ in size and/or distribution, or by gravure printing of lines which join up in the lengthwise and transverse directions, by engraved-roller printing, or by flexographic printing. The PSA may be present in the form of domes (produced by screen printing) or else in another pattern such as lattices, stripes, zigzag lines. Furthermore, for example, it may also have been applied by spraying, producing an irregular pattern of application.

The coat weight (coating thickness) of the PSA is preferably between 10 and 200 $g/m^2$, more preferably between 15 and 75 $g/m^2$, and very preferably between 20 and 50 $g/m^2$.

There is advantage to using an adhesion promoter, referred to as a primer coat, between carrier material and PSA, or to a physical pretreatment of the carrier surface in order to improve the adhesion of the adhesive to the carrier material. The above-described application of the PSA to the carrier also includes application to a carrier provided with a primer coat.

Primers which can be used are the known dispersion-based and solvent-based systems, based for example on isoprene- or butadiene-containing rubber, acrylate rubber, polyvinyl, polyvinylidene and/or cyclo rubber. Isocyanates or epoxy resins as additives improve the adhesion and in some cases also advantageously increase the shear strength of the PSA. The adhesion promoter may likewise be applied to the carrier film by means of a coextrusion layer. From the standpoint of the biodegradability of the adhesive tape of the invention, preference is given to using an at least partly biodegradable primer. With particular preference no primer is used. In the adhesive tapes of the invention, the force of anchorage between adhesive and carrier that can be achieved is generally sufficient, and so it is possible, advantageously, to do without a primer. Optionally, physical methods of surface treatment are employed, such as, for example, flaming, corona, and plasma.

Furthermore, the carrier material, on the reverse or upper face, in other words opposite the adhesive side, may have been subjected to an antiadhesive physical treatment or coating, more particularly furnished with a parting or release agent (optionally blended with other polymers).

Examples of parting or—synonymously—release layers are those of stearyl compounds (for example, polyvinylstearylcarbamate, stearyl compounds of transition metals such as Cr or Zr, ureas formed from polyethyleneimine and stearyl isocyanate) or polysiloxanes. The term "stearyl" stands as a synonym for all linear or branched alkyls or alkenyls having a C number of at least 10 such as octadecyl, for example.

Suitable release agents further comprise surfactant-type release systems based on long-chain alkyl groups, such as stearyl sulfosuccinates or stearyl sulfosuccinamates, but also polymers, which are selected from the group consisting of polyvinylstearylcarbamates such as, for example, Escoat 20 from Mayzo, polyethyleneimine-stearylcarbamides, chromium complexes of $C_{14}$ to $C_{28}$ fatty acids, and stearyl copolymers, as described in DE 28 45 541 A, for example. Likewise suitable are release agents based on acrylic polymers with perfluorinated alkyl groups, silicones based, for example, on poly(dimethylsiloxanes), and fluorosilicone compounds.

The carrier material may further be pretreated and/or aftertreated. Common pretreatments are hydrophobizing; customary aftertreatments are calendering, heating, laminating, diecutting, and enveloping.

The adhesive tape may have been laminated with a commercial release film or a release paper, consisting customarily of a base material of polyethylene, polypropylene, polyester or paper that has been coated on one or both sides with polysiloxane. A structure of this kind is often also termed a release liner and is not a constituent of the adhesive tape of the invention.

The adhesive tape of the invention may be produced by customary coating methods known to the skilled person. In this case, the polyurethane P (or the polyurethanes P), including where appropriate the additives, in solution in a suitable solvent, may be coated onto the carrier by means, for example, of engraved-roller application, comma bar coating, multi-roll coating or in a printing process, after which the solvent can be removed in a drying tunnel or drying oven. Alternatively, the coating of the carrier may also take place in a solvent-free process. For this purpose, the polyurethane is produced in an extruder. Within the extruder there may be additional operating steps such as mixing with the described additives, filtering, or degassing. The melt is then coated onto the carrier using a slot die.

The adhesive tape of the invention preferably has a peel adhesion on a steel substrate of at least 0.1 N/cm and a shear deformation of not more than 500 μm at a coat weight of 25 g/m². These values are preferably also achieved after storage for 3 months at 23° C., 40° C. or 70° C.

The general expression "adhesive tape" in the sense of this invention encompasses all sheetlike structures such as two-dimensionally extended films or film sections, tapes with extended length and limited width, tape sections, diecuts, labels, and the like. The adhesive tape may be made available in fixed lengths such as, for example, as product by the meter, or else as continuous product on rolls (Archimedean spiral).

EXAMPLES

The polyurethane prepolymer was produced by first weighing out the polyester polyol or polyols A and mixing it/them for approximately two hours in a customary heatable and evacuatable laboratory mixer (for example, from PC Laborsystem) under reduced pressure and at a temperature of 70° C. Then the diol or diols B were added and were incorporated for 20 minutes without reduced pressure. Subsequently, optionally, the remaining substances were added in the proportions indicated in the examples, and were incorporated by mixing for 20 minutes. Lastly, the at least one diisocyanate C was added, and was incorporated homogeneously by mixing for 20 minutes. The chemically reacting mixture was stored in a heating cabinet at 40° C. for 7 days in order to complete the reaction.

For the crosslinking, the polyurethane-prepolymer prepared was first of all dissolved in acetone. 25 g of acetone were always added per 100 g of prepolymer. Crosslinking was carried out using Desmodur® N3300 (polyisocyanate D).

Following the addition of the Desmodur® N3300 to the acetone solution of polyurethane prepolymer, the mixture was stirred for 5 minutes. The mixture, which was chemically reacting, was subsequently coated during the reaction phase onto a PET film etched with trichloroacetic acid and 23 μm thick, by means of a coating knife on a commercial laboratory benchtop coater (for example, from SMO (Sondermaschinen Oschersleben GmbH)). The acetone was evaporated in a forced-air drying cabinet at 60° C. for 10 minutes. The slot width on coating was adjusted so as to produce a pressure-sensitively adhesive film 25 μm (corresponding to about 25 g/m²) thick following evaporation of the solvent. The tapes freed from the solvent were subsequently lined with siliconized PET film, and the reaction was completed by storing them in a heating cabinet at 40° C. for 7 days.

Table 1 lists the substances used for producing the prepolymers and the crosslinked polyurethanes. The stated raw materials are all freely available commercially.

TABLE 1

Materials used for producing the example specimens

| Trade name | Chemical designation/ description | Number-average molecular weight $M_n$ | OH or NCO number (mmol OH/kg or mmol NCO/kg) | Functionality (f) | Manufacturer/ Supplier |
|---|---|---|---|---|---|
| Diols | | | | | |
| Capa 2043 ® | Polycaprolactone diol, basis: 1,4-butanediol (starter), caprolactone | 400 | 4991 | 2 | Perstorp |

TABLE 1-continued

Materials used for producing the example specimens

| Trade name | Chemical designation/ description | Number- average molecular weight $M_n$ | OH or NCO number (mmol OH/kg or mmol NCO/kg) | Functionality (f) | Manufacturer/ Supplier |
|---|---|---|---|---|---|
| Desmophen 1652 ® | Polyester diol based on 1,4-butanediol, ethylene glycol, diethylene glycol, adipic acid | 2120 | 941 | 2 | Bayer |
| MP Diol ® | 2-Methyl-1,3-propanediol (CAS No.: 2163-42-0) | 90.12 | 22193 | 2 | Lyondel |
| Catalyst | | | | | |
| Coscat 83 ® | Bismuth trisneodecanoate, CAS No.: 34364-26-6 | | | | Caschem |
| Isocyanates | | | | | |
| IPDI | Isophorone diisocyanate (CAS No.: 4098-71-9) | 222.28 | 8998 | 2 | Sigma-Aldrich |
| Desmodur N 3300 ® | HDI trimer with polyfunctional fractions | about 680 | 5190 | about 3.4 | Bayer |

Addition to table 1:
Bester 15: branched polyester polyol based on glycol/adipic acid, OH number: 1053 mmol OH/kg; functionality 3, $M_w$ about 3100 g/mol Test Methods Unless otherwise indicated, the measurements are carried out under test conditions of 23±1° C. and 50±5% relative humidity.

The test methods below were used to characterize the starting materials and also the specimens produced by the methods described.

Molecular Weight $M_n$

The number-averaged average molecular weights $M_n$ are determined in accordance with the invention by means of gel permeation chromatography (GPC). The eluent used is THF (tetrahydrofuran) with 0.1 vol % of trifluoroacetic acid. The measurements take place at 25° C. The pre-column used is PSS-SDV, 5μ, $10^3$ Å, ID 8.0 mm×50 mm. Separation takes place using the columns PSS-SDV, 5μ, $10^3$ and also $10^5$ and $10^6$ each with ID 8.0 mm×300 mm. The sample concentration is 4 g/l, the flow rate 1.0 ml per minute. Measurement is made against PMMA standards.

Hydroxyl Number

The hydroxyl numbers are determined according to DIN 53240. According to this method, the hydroxyl number (OHN) is reported in the unit [mg KOH/g]. In order to simplify the formula calculations in the examples given, the hydroxyl numbers were converted into the unit [mmol OH/kg].
This was done according to the following formula:

OHN [mmol OH/kg]=OHN [mg KOH/g]×1000/56.1 where 56.1 is the molar mass of KOH.

Hydroxy Functionality (f)

The hydroxy functionality (f) was calculated from the number-averaged average molecular weight $M_n$ and from the OH number (OHN) in accordance with the following equation:

$$f = M_n \text{ [g/mol]} \times \text{OHN[mmol OH/kg]}/10^6.$$

Surface Tension

The surface tension was determined using special test inks from Ahlbrandt (Lauterbach, Germany) in accordance with DIN ISO 8296. Measurement was carried out in steps of two in the range from 30 to 72 mN/m.

Change in Length (Thermal Stability)

Using a film marker and ruler, two parallel lines were drawn at a distance of 10 mm apart on a strip (20 cm long) of the respective carrier film. These lines were either in the machine direction (md) or perpendicular (cd) thereto. The film was subsequently fixed, without tension or strain, to a substrate, which was subsequently stored in a forced air oven for 5 minutes at the specific temperature indicated. When the film had cooled, the distance between the previously drawn lines was measured again ($L_1$), and the percentage change in length was calculated as follows:

$$L = \left(1 - \frac{L1}{10 \text{ mm}}\right) \times 100$$

A negative change in length therefore signifies contraction of the film, whereas a positive sign denotes stretching.

Immediate Peel Adhesion

The initial peel adhesion of the various PSAs on the respective carrier materials was tested in a method based on PSTC-1. The PSAs were first of all—as already described above—applied with an application weight of 25 g/m² to a PET film which was 23 µm thick and had been etched using trichloroacetic acid, and was stored. A strip of the PSA tape 2 cm wide, consisting of the PET film with the pressure-sensitively adhesive film (25 g/m²) applied to it, was adhered to the corresponding carrier film by being rolled over back and forth five times with a 5 kg roller. The film was clamped in, and the self-adhesive strip was peeled via its free end at a peel angle of 90° and at a speed of 300 mm/min, using a tensile testing machine. The force required to accomplish peeling was ascertained. The measurement results were averaged over three measurements and reported as standardized for the width of the strip in N/cm.

Determination of Biodegradability

The biodegradability by composting was determined in accordance with DIN EN 13432. This is a chemical test in which over the six-month test duration, a degree of degradation of 90% must be achieved relative to a reference substance in the presence of microorganisms or fungi. The conditions (temperature, oxygen content, and moisture level) are precisely defined here. Degradation must take place to form water, carbon dioxide, and biomass. There is a subsequent chemical analysis and evaluation of the quality of the compost.

Likewise as part of this investigation, there is a test for disintegration behavior. The disintegration refers to the physical breakdown of a material into very small fragments. Here, at least 90% of the plastic must have been broken down into particles smaller than 2 mm within 12 weeks. Only if both tests are passed is a substance classified as "biodegradable" in accordance with the DIN standard.

Owing to the high level of complexity and the resultant high costs, this test took place only on certain selected examples.

Determination of Disintegration Behavior

For all of the test specimens, there was a separate test of the disintegration behavior in accordance with DIN EN ISO 20200.

This standard describes the determination of the disintegrability (degree of disintegration) of polymers under model composting conditions on the laboratory scale. The investigations were carried out using commercial compost earth, in this case the compost earth with the brand name Tango-comp® from VKN-Vertriebsgesellschaft Kompostprodukte Nord mbH. The marketing company is located in Tangstedt, in Schleswig-Holstein, and obtains its raw compost materials from the area around Hamburg. The moisture content of the compost earth was adjusted to 55 to 60%. To determine the moisture content, three samples of compost earth each of 10 g were dried at 120° C. for 2 hours, followed by determinations of the moisture loss and hence the water content of the earth. Moisture deficit was made up in the form of unchlorinated mains water.

First of all, 50 g of the compost earth adjusted to a moisture content of 60% were weighed out into a 250 mL PE beaker. Placed subsequently onto this first layer of earth was a section of the sample under investigation, measuring approximately 9 cm². A second layer of compost earth, again 50 g in weight, was then placed onto the sample. The PE beaker was closed with a lid. To ventilate the compost, the lid had been provided beforehand with three holes each with a diameter of 2.0 mm. The sample prepared in this way was stored at 58±2° C. for not more than 90 days, with the water loss being compensated by addition of water every 2 to 3 days. Once a week the progress of disintegration of the samples was ascertained by visual inspection, and the time taken for complete disintegration (disintegration time) was recorded.

Mass 1 (PSA of the Invention)

The polyurethane prepolymer 1 has the following composition:

| Raw material | Initial mass [g] | Amount of OH or NCO groups introduced |
|---|---|---|
| Desmophen 1652 ® | 88.7 | 83.6 mmol OH |
| MP Diol ® | 1.3 | 28.9 mmol OH |
| Coscat 83 ® | 0.1 | |
| IPDI | 9.9 | 89.1 mmol NCO |
| Total | 100.0 | |

NCO:OH = 0.8

Crosslinking Step

Polyurethane 1a:

| Raw material | Mass introduced [g] | Amount of OH or NCO groups introduced (assumption of complete NCO conversion in prepolymer preparation) |
|---|---|---|
| PU-Prepolymer 1 | 100.0 | 23.4 mmol OH |
| Acetone | 25.0 | |
| Desmodur N 3300 ® | 4.0 | 20.8 mmol NCO |

NCO:OH = 0.89.

Mass 2 (Non-Inventive PSA)

The polyurethane prepolymer 2 has the following composition:

| Raw material | Initial mass [g] | Amount of OH or NCO groups introduced |
|---|---|---|
| Bester 15 | 50.4 | 53.1 mmol OH |
| MP Diol ® | 4.8 | 106.1 mmol OH |
| Capa 2043 | 21.3 | 106.1 mmol OH |
| Coscat 83 ® | 0.1 | |
| IPDI | 23.4 | 212.2 mmol NCO |
| Total | 100.0 | |

NCO:OH = 0.8.

Crosslinking Step
Polyurethane 2a:

| Raw material | Mass introduced [g] | Amount of OH or NCO groups introduced (assumption of complete NCO conversion in prepolymer preparation) |
|---|---|---|
| PU-Prepolymer 2 | 100.0 | 53.05 mmol OH |
| Acetone | 25.0 | |
| Desmodur N 3300 ® | 9.2 | 47.8 mmol NCO |

NCO:OH = 0.9.

Carrier films used were the following materials:
30 µm Ecovio® F Film C2331 (from BASF, hereinafter Ecovio®)
19 µm polyethylene film (PE)
40 µm polybutylene succinate film (PBS)

Results

Surface tension [mN/m]

| Corona dose [Wmin/m$^2$] | ecovio ® 30 µm | PE (19 µm) | PBS |
|---|---|---|---|
| 0 | 36 | 38 | 44 |
| 20 | 36 | 38 | 56 |
| 30 | 38 | 38 | 56 |
| 40 | 38 | 38 | 56 |
| 50 | 42 | 44 | 58 |
| 60 | 44 | 44 | 60 |
| 70 | 48 | 44 | 60 |

Thermal stability (change in length [%])

| Temperature (direction) | ecovio ® 30 µm | PE (19 µm) | PBS |
|---|---|---|---|
| 100° C. (cd) | 0.7 | 0.7 | 0.0 |
| 100° C. (md) | −0.7 | −1.4 | 0.0 |
| 110° C. (cd) | 0.7 | 1.3 | −0.3 |
| 110° C. (md) | −2.7 | −2.7 | −0.2 |
| 120° C. (cd) | −0.4 | 3.0 | −1.1 |
| 120° C. (md) | −3.0 | −4.9 | −1.8 |

| Immediate peel adhesion [N/cm] | Polyurethane 1a | Polyurethane 2a | Polyacrylate PSA |
|---|---|---|---|
| PBS | 0.7 | 0.05 | 0.09 |
| PE | 0.03 | Not determined | Not determined |
| ecovio ® | 0.27 | 0.03 | Not determined |

The polyacrylate of the polyacrylate PSA had the following monomer composition:

| acrylic acid | 0.7 wt % |
| n-butyl acrylate | 34.7 wt % |
| 2-ethylhexyl acrylate | 34.6 wt %. |

The adhesive contained the polyacrylate and 30 wt % of a terpene-phenolic resin.

Following combinations of adhesive and carrier gave a biodegradable and disintegrable adhesive tape in accordance with the method described above:

PBS—polyurethane 1a
PBS—polyurethane 2a
Ecovio®—polyurethane 1a
Ecovio®—polyurethane 2a.

The invention claimed is:

1. An adhesive tape for protecting surfaces, comprising:
   a pressure-sensitive adhesive H comprising at least 60 wt % of at least one polyurethane P obtained by chemical crosslinking of a polyurethane prepolymer obtained by chemical reaction of a mixture of reactants comprising:
   a) one or more aliphatic polyester polyols A having a hydroxy functionality of from 1.8 up to and including 2 and a number-average molecular weight of greater than or equal to 1000 g/mol;
   b) one or more compounds B having a hydroxy functionality of from 1.8 up to and including 2 and a number-average molecular weight of less than 1000 g/mol;
   c) one or more aliphatic diisocyanates C;
   where the ratio of the total number of isocyanate groups to the total number of hydroxy groups in said mixture of reactants is greater than or equal to 0.4 and less than 1; and
   a biodegradable carrier.

2. The adhesive tape as claimed in claim 1, wherein the ratio of the total number of the isocyanate groups to the total number of hydroxy groups in the mixture of reactants is greater than or equal to 0.75 and less than 1.

3. The adhesive tape as claimed in claim 1, wherein the biodegradable carrier comprises at least one polyester PolEs which is formed from a monomer composition MonZ consisting of
   at least one $C_2$ to $C_{12}$ alkanediol and
   at least one dicarboxylic acid selected from the group consisting of oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassilic acid, fumaric acid, 2,2-dimethylglutaric acid, suberic acid, diglycolic acid, oxalacetic acid, glutamic acid, aspartic acid, itaconic acid, maleic acid, and terephthalic acid
or which is a polycaprolactone.

4. The adhesive tape as claimed in claim 3, wherein the monomer composition MonZ consists of
   butanediol as the at least one $C_2$ to $C_{12}$ alkanediol and
   at least one member selected from the group consisting of adipic acid, terephthalic acid, and succinic acid as the at least one dicarboxylic acid.

5. The adhesive tape as claimed in claim 3, wherein the biodegradable carrier comprises at least 40 wt % of polyester PolEs, based on the total weight of the biodegradable carrier.

6. The adhesive tape as claimed in claim 1, wherein the biodegradable carrier consists, of polybutylene succinate, a butanediol-adipic acid-terephthalic acid copolymer, or a blend of a butanediol-adipic acid-terephthalic acid copolymer and polylactic acid.

7. The adhesive tape as claimed in claim 1, wherein the chemical crosslinking to form the polyurethane P takes place by reaction of the polyurethane prepolymer with at least one polyisocyanate D having three or more isocyanate groups.

8. A method comprising bonding a material with an adhesive tape, wherein the adhesive tape is an adhesive tape as claimed in claim 1.

* * * * *